No. 780,175.

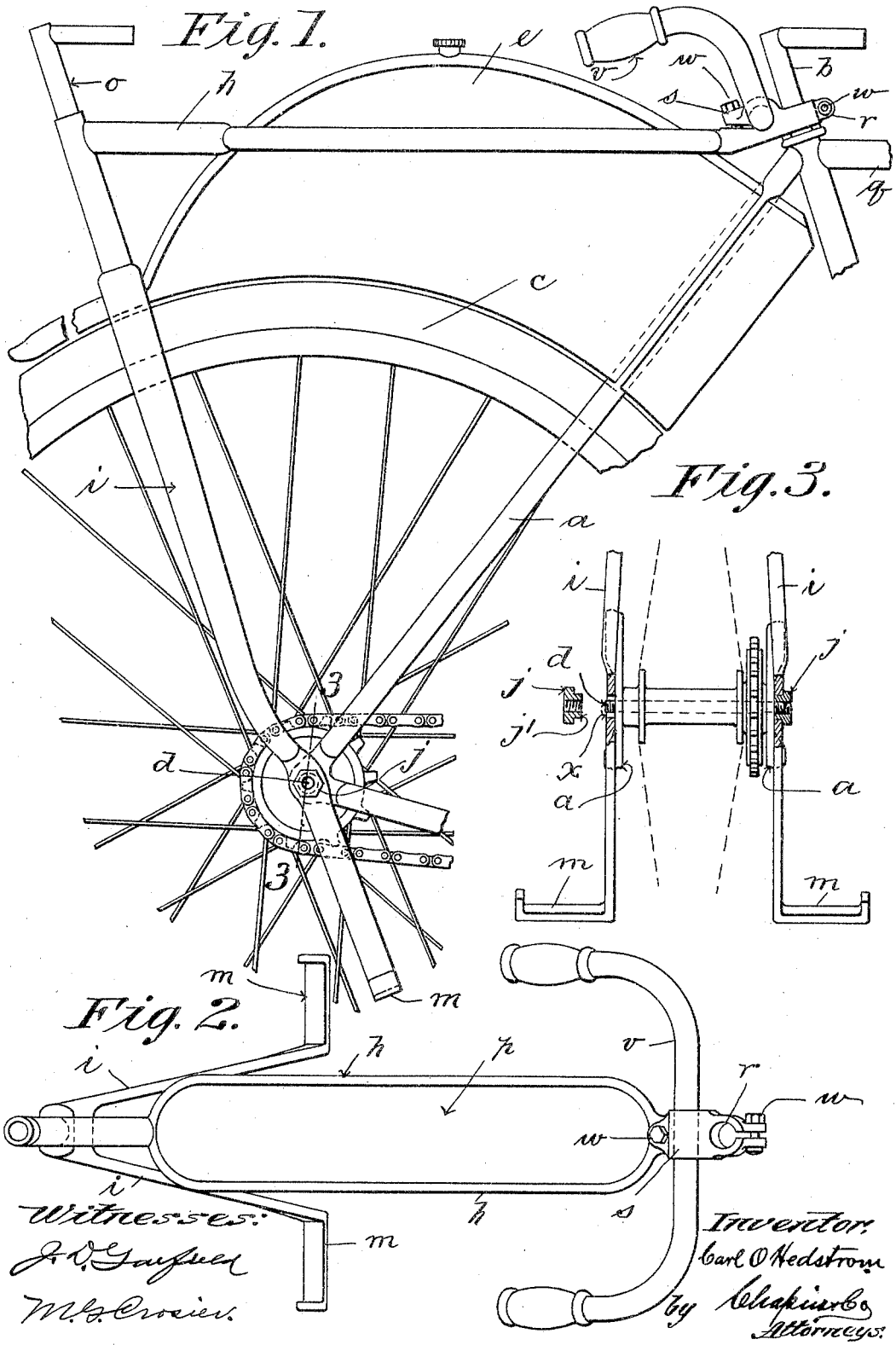

Patented January 17, 1905.

UNITED STATES PATENT OFFICE.

CARL O. HEDSTROM, OF SPRINGFIELD, MASSACHUSETTS.

TANDEM SEAT FOR BICYCLES.

SPECIFICATION forming part of Letters Patent No. 780,175, dated January 17, 1905.

Application filed May 4, 1904. Serial No. 206,285.

*To all whom it may concern:*

Be it known that I, CARL O. HEDSTROM, a citizen of the United States of America, residing at Springfield, in the county of Hampden and State of Massachusetts, have invented new and useful Improvements in Tandem Seats for Bicycles, of which the following is a specification.

This invention relates to bicycle construction; and the object thereof is to provide an auxiliary rearwardly-extending seat-frame for motor-cycles, with means to secure it to the frame of the latter to convert the same into a tandem. Broadly speaking, this auxiliary-frame construction is not new, and this invention resides in certain novel features, which will be described in the following specification and claims and are clearly illustrated in the accompanying drawings, in which—

Figure is a side elevation of a portion of a bicycle-frame to which the auxiliary-frame portion embodying this invention is attached. Fig. 2 is a plan view of the auxiliary tandem-seat frame; and Fig. 3 is a sectional elevation taken on line 3 3, Fig. 1, looking to the right and showing the manner of securing the frame to the rear axle of the machine.

Referring to the drawings, $a$ indicates a portion of the rear-wheel fork of a motor-cycle; $b$, the ordinary seat-post mounted in the frame; $c$, the rear wheel, which rotates on the axle $d$, the latter being secured rigidly to the end of the rear-fork frame in the usual manner. The fuel-reservoir is indicated by $e$ and constitutes a portion of the rear-wheel guard and is carried just behind the seat-post $b$. This position of the fuel-reservoir is that adapted in the best motor-cycle constructions to-day, as it provides for the proper feeding of the fuel by gravity.

In carrying out this invention the auxiliary frame is made with a horizontally-disposed upper member $h$ and an angularly-disposed forked member $i$ to straddle the rear wheel and to be secured to the axle of the latter by a peculiarly-formed nut $j$, which permits the use of the ordinary axle. Said forked member $i$ is rigidly secured to the member $h$ in the manner usually employed in frame constructions of this class and is so disposed that together with said member $h$ and the rear-wheel fork $a$ they constitute a substantially equilateral triangle. The ends of the fork of the member $i$ are extended below the axle $d$, and their extremities are turned outwardly, as shown, to constitute foot-rests $m$. The upper end of this forked member is $i$ made tubular to receive the seat-post $o$, to which the auxiliary seat may be secured in the ordinary manner. The member $h$ of the auxiliary frame is formed with oblong openings $p$ therein to receive the upper end of the fuel-reservoir. This permits the member $h$ to run horizontally in practical continuation of the top bar $q$ of the main frame, and, furthermore, it affords additional support to the fuel-reservoir $e$. The forward end of this member $h$ is provided with a solid head, in which are embodied two split clamps $r$ and $s$. The former is vertically disposed to receive the shank of the regular seat-post $b$, and the other clamp is horizontally disposed to receive the handle-bar $v$. These clamps are provided with bolts $w$, whereby the member $h$ may be secured to the seat-post $b$ and whereby the handle-bars $v$ may be adjustably secured in position to adapt them to the occupant of the auxiliary rear seat. This construction permits the auxiliary frame to be removed without disturbing the adjustment of the handle-bar. Another useful and novel feature of this construction consists in the means devised to attach the auxiliary frame to the axle $d$, which is the same axle as is used when this frame is not in position. This means consists in boring a hole $x$ through the forks of the member $i$, having a considerably larger diameter than the axle, and in making the nut $j$ with a short shank $j'$ to enter this hole in the forks, the shank and nut being threaded to screw onto the ends of the axle from which the ordinary nuts have been removed, the length of the shanks $j'$ being slightly less than the thickness of the forks, to the end that the head of the nuts may come to a bearing on the outside of the forks before the end of the shanks $j'$ comes to a bearing against the forks $a$. Thus both fork ends are secured by these nuts $j$. Heretofore it has been the practice to remove the ordinary axle and substitute a longer one which would permit the use of an ordinary nut applied to the ends of the axle, which extend beyond the sides of the forks on the member *i*.

Having thus described my invention, what I claim, and desire to secure by Letters Patent of the United States, is—

1. An auxiliary tandem-seat frame for motor-cycles and the like consisting of a horizontally-disposed member constituting substantially an extension of the top bar of a motor-cycle frame, said member having an opening therein; a forked member secured to one end of the horizontal member and extending astride of the wheel to and beyond the axle of the latter, together with means to secure said forked member to the axle, and means to secure the free end of the horizontal member to the frame of the motor-cycle, and a seat on said last-named member.

2. An auxiliary tandem-seat frame for motor-cycles and the like consisting of a horizontally-disposed member constituting substantially a rearward extension of the top bar of the motor-cycle frame; means to secure one end of said member to the frame of the cycle, a support for the opposite end extending to and beyond the rear wheel-axle to constitute a foot-rest; means to secure said support to the ends of said axle, a clamping device on said horizontal member to secure a handle-bar thereto, and a seat on said horizontal member.

3. An auxiliary tandem-seat frame for motor-cycles and the like comprising a horizontal member, and a second member secured to one end thereof and extending to and beyond the axle of the rear wheel of the cycle; a clamp on the free end of the horizontal member to secure the latter to the cycle-frame, in substantial alinement with the top bar thereof; a second clamp near said first-named clamp to support a handle-bar; said horizontal frame member having an opening therein, means to secure said second frame member to the axle of the rear wheel of the cycle; together with a seat on said horizontal member.

4. The combination with the frame of a motor-cycle having a reservoir located over the rear wheel and secured to the frame, of a tandem-seat frame comprising a horizontally-disposed member having an opening therein through which said reservoir extends; a clamp to secure one end of said member to the cycle-frame, and a support for the opposite end of said member extending to the rear-wheel axle; said support extending beyond the axle to constitute a foot-rest; together with a handle-bar supported on said horizontal member of the seat-frame, and a seat also supported on said member.

5. An auxiliary tandem-seat frame for motor-cycles comprising a forked member located astride of the rear wheel of the cycle, a horizontally-disposed member extending from the upper end of the forked member to the frame of the cycle, means to removably secure the end of said horizontal member to the frame of the cycle, and means to secure the lower ends of said forked member to the rear-wheel axle of the cycle, consisting of a nut having a shank extending through the end of the forks, and a head on the nut to bear on the outer surface of the forks, said shank being threaded to screw onto the end of the axle; together with handle-bars and a suitable seat secured in proper position on said horizontally-disposed member.

CARL O. HEDSTROM.

Witnesses:
 Wm. H. Chapin,
 K. I. Clemons.